United States Patent
Merrien et al.

(10) Patent No.: US 9,388,868 B2
(45) Date of Patent: Jul. 12, 2016

(54) DISC BRAKE COMPRISING A BRAKE PAD PRELOAD SPRING

(71) Applicant: CHASSIS BRAKES INTERNATIONAL B.V., Amsterdam (NL)

(72) Inventors: Sandra Merrien, Paris (FR); Andre Gaye, Dalian (CN)

(73) Assignee: CHASSIS BRAKES INTERNATIONAL B.V., Amsterdam (NL)

( * ) Notice: Subject to any disclaimer, the term of this patent is extended or adjusted under 35 U.S.C. 154(b) by 46 days.

(21) Appl. No.: 14/265,890

(22) Filed: Apr. 30, 2014

(65) Prior Publication Data

US 2014/0326548 A1    Nov. 6, 2014

(30) Foreign Application Priority Data

May 2, 2013   (FR) ...................................... 13 54036

(51) Int. Cl.
  *F16D 65/097*  (2006.01)
  *F16D 65/00*   (2006.01)

(52) U.S. Cl.
  CPC ........ *F16D 65/0978* (2013.01); *F16D 65/0006* (2013.01); *F16D 65/0972* (2013.01); *F16D 65/0977* (2013.01)

(58) Field of Classification Search
  CPC ............ F16D 65/0978; F16D 65/0006; F16D 65/0987; F16D 65/46; F16D 65/18; F16D 65/0977; F16D 65/0972; F16D 65/0979; F16D 65/0973; F16D 65/0974
  USPC .............................. 188/73.38, 73.36; 267/160
  See application file for complete search history.

(56) References Cited

U.S. PATENT DOCUMENTS 6,296,085 B1 * 10/2001 Yukoku ............... F16D 65/0972
                                                188/73.36
6,527,090 B1 *  3/2003 Barillot ............... F16D 65/0978
                                                188/73.1

(Continued)

FOREIGN PATENT DOCUMENTS

FR       2904990 A1    2/2008
JP    2009209961 A     9/2009

(Continued)

OTHER PUBLICATIONS

French Search Report, dated Apr. 10, 2014, from corresponding FR application.

*Primary Examiner* — Robert A Siconolfi
*Assistant Examiner* — San Aung
(74) *Attorney, Agent, or Firm* — Young & Thompson

(57) ABSTRACT

A disc brake whose carrier (11) includes two opposite arms (14$_F$, 14$_B$) each including a C-shaped axial housing (16$_F$, 16$_B$) accommodating a brake pad (12) including two opposite lateral lugs (26$_F$, 26$_B$), each lug (26) accepting a pad spring (40$_F$, 40$_B$) including at least one lower, sliding, branch (42$_F$, 42$_B$) and in which a lamellar element (22$_F$, 22$_B$) is interposed between the lug (26$_F$, 26$_B$) and the C-shaped housing (16$_F$, 16$_B$), this element (22$_F$, 22$_B$) including a lower first sliding flange (24$_F$, 22$_B$) accepting the sliding branch (42$_F$, 22$_B$) of the pad spring (40$_F$, 40$_B$) and an upper second flange (25$_F$, 25$_B$) for bearing vertically in the housing (16), at least one tangential preload spring (60$_B$) for tangentially preloading the pad (12) interposed between an arm (14$_B$) and the pad (12) and constantly urging the pad (12$_B$) in a direction (D$_F$) that is horizontal overall from the back forward.

6 Claims, 3 Drawing Sheets

(56) References Cited

U.S. PATENT DOCUMENTS

| | | | | |
|---|---|---|---|---|
| 2004/0144602 A1* | 7/2004 | Ono | ................... | F16D 65/0971 188/71.7 |
| 2005/0274579 A1* | 12/2005 | Nogiwa | .............. | F16D 65/0977 188/73.38 |
| 2007/0251772 A1* | 11/2007 | Tsurumi | ............... | F16D 65/095 188/73.38 |
| 2009/0159376 A1* | 6/2009 | Rossignol | ............ | F16D 65/095 188/73.38 |
| 2010/0147635 A1* | 6/2010 | Hayashi | .............. | F16D 65/0977 188/73.38 |
| 2012/0090927 A1* | 4/2012 | Bach | .................... | F16D 65/097 188/72.3 |
| 2012/0222925 A1* | 9/2012 | Kaneko | ............... | F16D 65/0977 188/73.38 |

FOREIGN PATENT DOCUMENTS

| | | |
|---|---|---|
| JP | 2010196875 A | 9/2010 |
| WO | 2013087862 A1 | 6/2013 |

* cited by examiner

US 9,388,868 B2

DISC BRAKE COMPRISING A BRAKE PAD PRELOAD SPRING

TECHNICAL FIELD OF THE INVENTION

The invention relates to a motor vehicle disc brake.

BACKGROUND OF THE INVENTION

The invention relates to a motor vehicle disc brake comprising:
- a carrier comprising at least two opposite arms, back and front respectively, of vertical overall orientation and each comprising:
  - a C-section axial housing open horizontally towards the opposite arm and delimited by an upper face and by a lower face of horizontal overall orientation;
  - an axial bearing surface of vertical overall orientation and arranged under the housing;
- at least one brake pad comprising:
  - two opposite lateral mounting lugs, back and front respectively, each of which is housed with transverse clearance in an associated housing of the associated back and front arm respectively of the carrier and is delimited by an upper facet of horizontal overall orientation;
  - associated with each lug, a facet, referred to as abutment facet, of vertical orientation;
- for each lug of the brake pad, a brake pad guiding spring, back and front respectively, which is fixed to the associated lug, back and front respectively, of the brake pad and which comprises at least one sliding lower branch which collaborates with the lower face of the associated housing and which urges the said upper facet of the lug to press vertically upwards against the upper face of the associated housing;
- a brake disc which rotates as one with an associated wheel of a vehicle and which extends in a plane transverse to the carrier and comprises two opposite annular braking tracks one of which has the said brake pad pressed against it under braking;
- for each arm of the carrier, a lamellar element, back and front respectively, made of spring steel, which comprises at least:
  - a C-section axial upper sliding part which is housed and blocked in the associated housing, which comprises a lower first flange, referred to as sliding flange, of substantially horizontal overall orientation which is interposed between the sliding branch of the pad spring and the lower face of the housing of the carrier, and an upper second flange, referred to as vertical bearing flange, of horizontal overall orientation, which is interposed between the upper facet of the associated lug of the brake pad and the upper face of the associated housing;
  - at least one axial lower bearing part comprising a third flange, referred to as transverse bearing flange, which extends the sliding flange of vertical overall orientation and is arranged in contact with the transverse bearing surface of the associated arm and is able to act as a transverse end stop for the associated lower facet of the brake pad,
in which the transverse bearing surface of the front arm is able to form a transverse end stop for the end stop facet of the front lug of the brake pad when the brake pad is being pressed against the brake disc when the vehicle being driven in a forwards gear is being braked.

A disc brake of this type is known from the prior art.

In such a disc brake, the brake pad is slideably mounted in the carrier via pad springs.

Under braking, the brake pad is thus able to move in the carrier in an axial direction and under the action of a force applied by at least one brake piston.

The brake pad is also able to move in a transverse direction because it is subjected to the tangential forces or loads applied via the friction forces exerted on a friction lining of the brake pad as a result of the contact between this friction lining and an associated annular face of the brake disc.

In order to allow the brake pad to move axially there is a transverse functional clearance between the brake pad and the carrier. The purpose of this clearance is to prevent the brake pads from jamming and to allow them to slide properly in the axial direction.

This transverse functional clearance is covered by the brake pad under braking. The greater this clearance, the more kinetic energy is stored up by the brake pad as it switches from a state of rest to a state of braking. This kinetic energy is further increased in a shift from reverse gear to a forwards gear or vice versa.

The energy stored in the brake pad is released upon contact between the brake pad and the carrier, creating a parasitic knocking noise audible to the driver of the vehicle.

SUMMARY OF THE INVENTION

In order to overcome this disadvantage, the invention proposes for the brake pad to be urged elastically toward the front lamellar element so as to reduce the clearance between the brake pad and the lamellar element, the objective here being to reduce the amount of energy stored by the brake pad when passing from one state to another and, therefore, to reduce knocking noises.

The invention also makes it possible to damp the brake pad in an opposite transverse movement towards the back lamellar element.

The invention overcomes this disadvantage by proposing a disc brake of the type described hereinabove, characterized in that it comprises at least one tangential preload spring for tangentially preloading the brake pad, which is interposed between an arm and the brake pad, which constantly urges the brake pad in a direction that is horizontal overall, from the back forward, so as, in the absence of any braking force applied to the brake pad, to define a small determined clearance between the associated end stop facet of the brake pad and the transverse bearing flange of the front lamellar element.

According to other features of the invention:
- the said brake pad tangential preload spring is mounted compressed between the back arm and an associated part opposite belonging to the brake pad,
- the said brake pad preload spring is an elastically deformable leaf formed as a single piece with the back lamellar element,
- the brake pad comprises an upper facet referred to as the preload facet, of vertical orientation and situated above the back lateral lug, and the said elastically deformable leaf is of vertical overall orientation, extends the vertical bearing flange of the back lamellar element upwards and collaborates with the said preload facet of the brake pad,
- the said elastically deformable leaf is a leaf in the shape of a hairpin which comprises a back branch which extends the vertical bearing flange of the back lamellar element upwards and a front branch which collaborates with the said preload facet of the brake pad, the said front branch comprises a free lower end section of domed profile of which a convex face collaborates with the said preload facet of the brake pad, the said back branch collaborates with a complementary part opposite belonging to the back arm so as to immobilize the back lamellar element axially with respect to the back arm.

SUMMARY OF THE FIGURES

Other features and advantages of the invention will become apparent from reading the detailed description which follows, for an understanding of which reference will be made to the attached drawings in which.

DETAILED DESCRIPTION OF THE FIGURES

Figure 1:
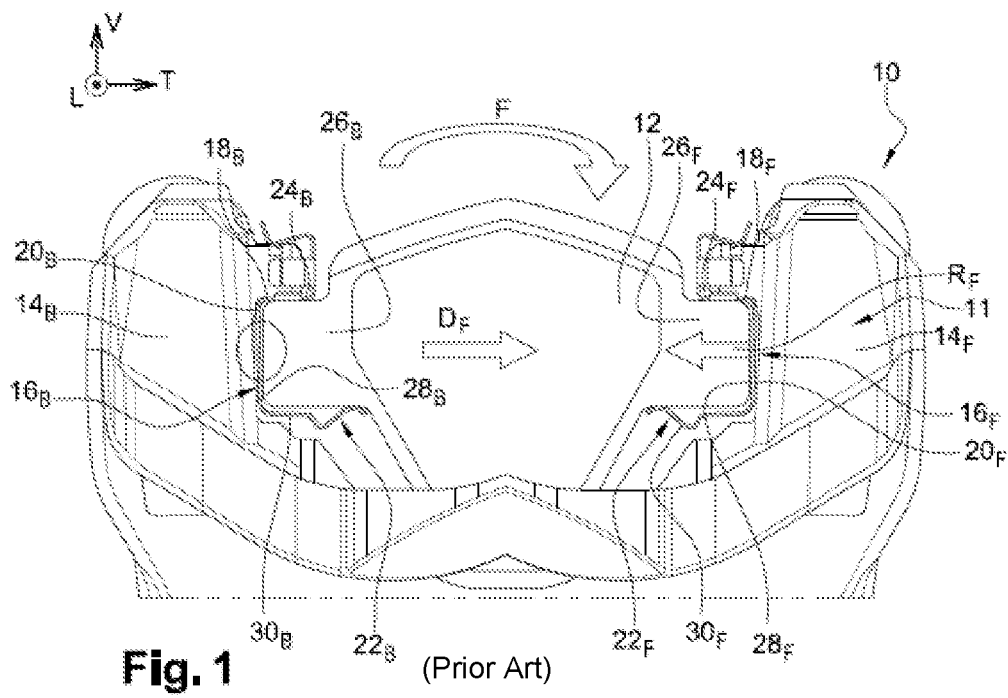
FIG. 1 is an axial end-on view of a mounting of a brake pad in a carrier of a disc brake according to a prior art and in which the brake pad is depicted in a position in which a braking force is being applied with the vehicle in a forward gear.

In the description and the claims that are to follow, non-limiting use will be made of expressions such as "axial", "transverse" and "vertical" orientations with reference to the dihedral frame of reference (L, T, V) depicted in the figures and to the definitions given in the description, and without reference to the earth's gravitational field.

Identical reference numerals denote components that are identical or have similar functions.

According to the present description, the suffixes "F" and "B" are respectively and by convention assigned to components oriented in the direction of forwards and backwards rotation of a brake disc of a disc brake that forms the subject of the invention, these corresponding to the directions of rotation of the disc which are associated respectively with the directions of running in forwards gear and in reverse gear of a motor vehicle one wheel of which is equipped with such a disc brake.

FIG. 1 depicts a brake pad 12 mounted in a carrier 11 of a disc brake 10 according to one form of prior art.

The brake pad 12 comprises two opposite lugs $26_F$ and $26_B$ respectively oriented with respect to the forwards and backwards directions of rotation of a brake disc.

In a known way, the carrier 11 comprises two opposite arms $14_F$, $14_B$ which are substantially parallel and of vertical overall orientation "V", each of which comprises a housing $16_F$, $16_B$ oriented axially in the direction "L", having a C-section open horizontally towards the opposite arm $14_B$, $14_F$.

Each housing $16_F$, $16_B$ comprises an upper face $18_F$, $18_B$ of horizontal overall orientation and a parallel lower face $20_F$, $20_B$ of horizontal overall orientation.

The housing $16_F$, $16_B$ accepts and houses a lamellar element $22_F$, $22_B$ made of spring steel, which comprises at least one upper flange $24_F$, $24_B$ for sliding and bearing, of horizontal overall orientation, which is interposed between the lug $26_F$, $26_B$ of the brake pad 12 and the upper face $18_F$, $18_B$ of the housing $16_F$, $16_B$, a vertical bearing flange $28_F$, $28_B$ of vertical orientation, which is interposed between the lug $26_F$, $26_B$ of the brake pad 12 and the vertical face 20, and an elastic retaining flange $30_F$, $30_B$ which is arranged under the lug $26_F$, $26_B$ of the brake pad 12.

In a brake of this type, the brake pad 12 is slideably mounted in the carrier 11 via the lamellar elements $22_F$, $22_B$ made of spring steel.

In order to allow the brake pad 12 to move axially, there is transverse functional clearance between the lugs $26_F$, $26_B$ of the brake pad 12 and the lamellar elements $22_F$, $22_B$ made of spring steel which are housed in the arms $14_F$, $14_B$ of the carrier 11.

As illustrated in FIG. 1, when the disc is turning in the direction of rotation for forward travel "F", the brake pad 12 is moved in the direction of the arrow $D_F$ covering the clearance between the lug $26_F$ and the vertical bearing flange $28_F$ of the lamellar element $22_F$.

Figure 2:
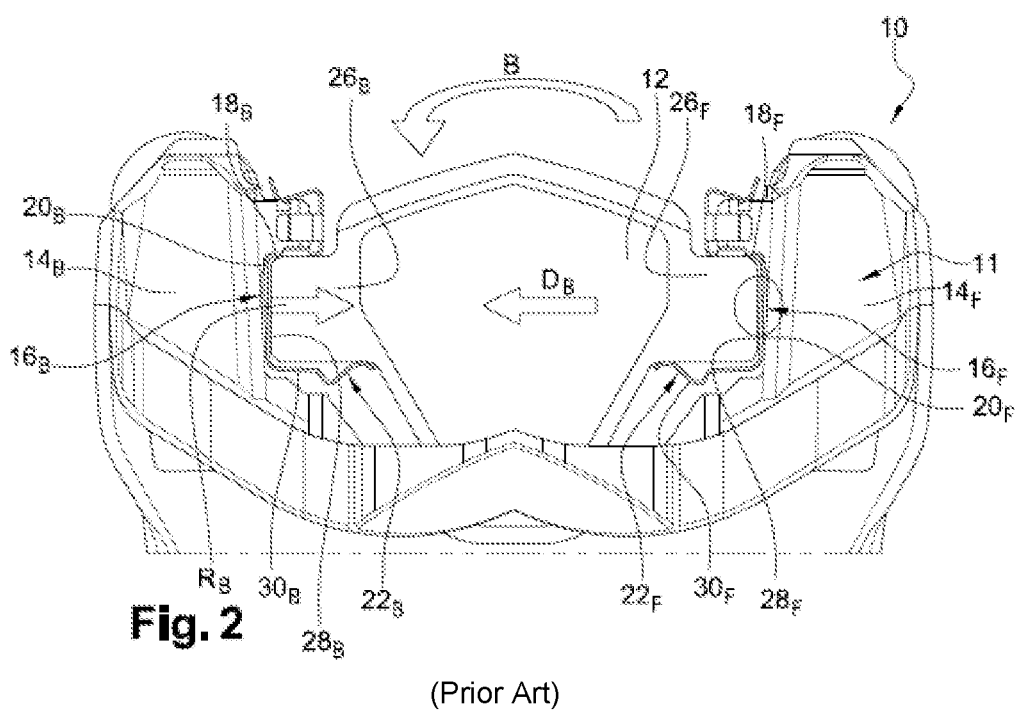
FIG. 2 is a view similar to that of FIG. 1 in which the brake pad is depicted in a position of applying a braking force with the vehicle in reverse gear.

As illustrated in FIG. 2, when the disc is turning in the direction of rotation for reverse travel "B", the brake pad 12 moves in the direction of the arrow $D_B$, covering the clearance between the lug $26_B$ and the vertical bearing flange $28_B$ of the lamellar element $22_B$.

The flanges $28_F$, $28_B$ of the lamellar elements $22_F$, $22_B$ have a transverse stiffness so as to apply load $R_F$ or $R_B$, depending on the direction of rotation, to damp the brake pad 12 and prevent the energy stored in the brake pad from being released upon contact between the brake pad and the corresponding arm of the carrier.

However, such a disc brake exhibits problems said to be problems of stability of the brake pads 12, such a setup making it impossible to determine reliably and repeatably how much torque there will be upon contact between the brake pad 12 and the carrier 11.

In order to reduce this transverse stiffness, it has been proposed in the known way to decouple the vertical bearing flanges $28_F$, $28_B$ of the lamellar elements $22_F$, $22_B$ from the sliding flanges $24_F$, $24_B$ and horizontal support flanges.

Figure 3:
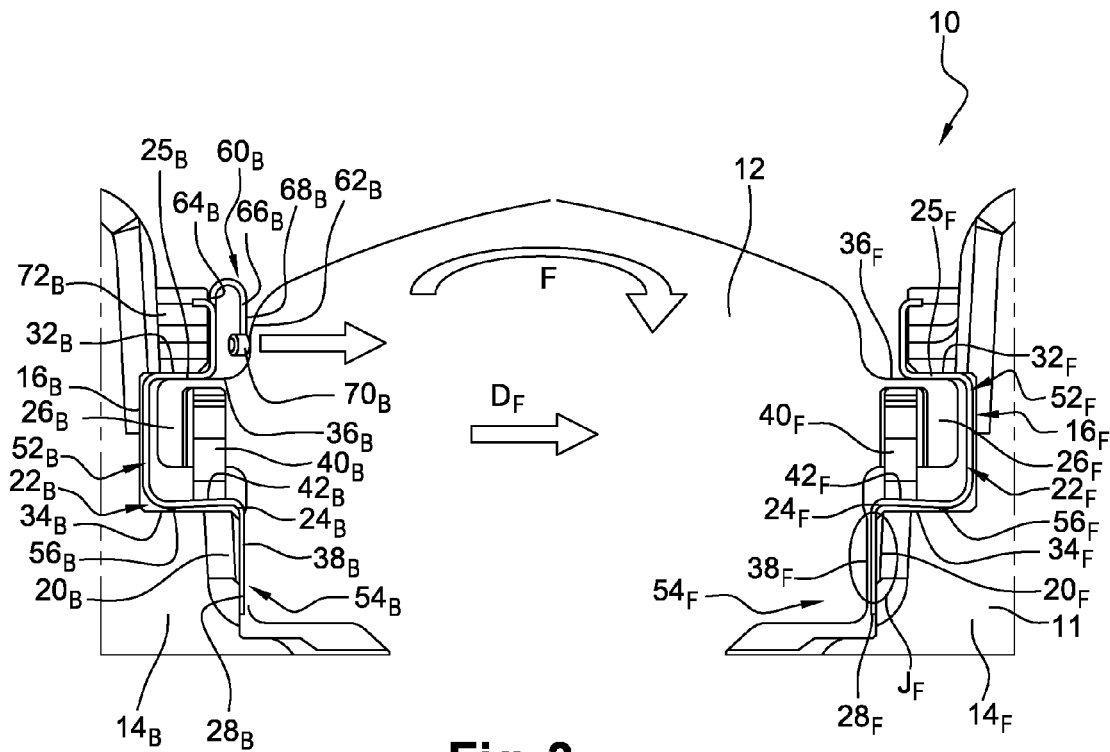
FIG. 3 is a view similar to that of FIG. 1 illustrating the mounting of a brake pad in a carrier of a disc brake according to the invention.
Figure 4:
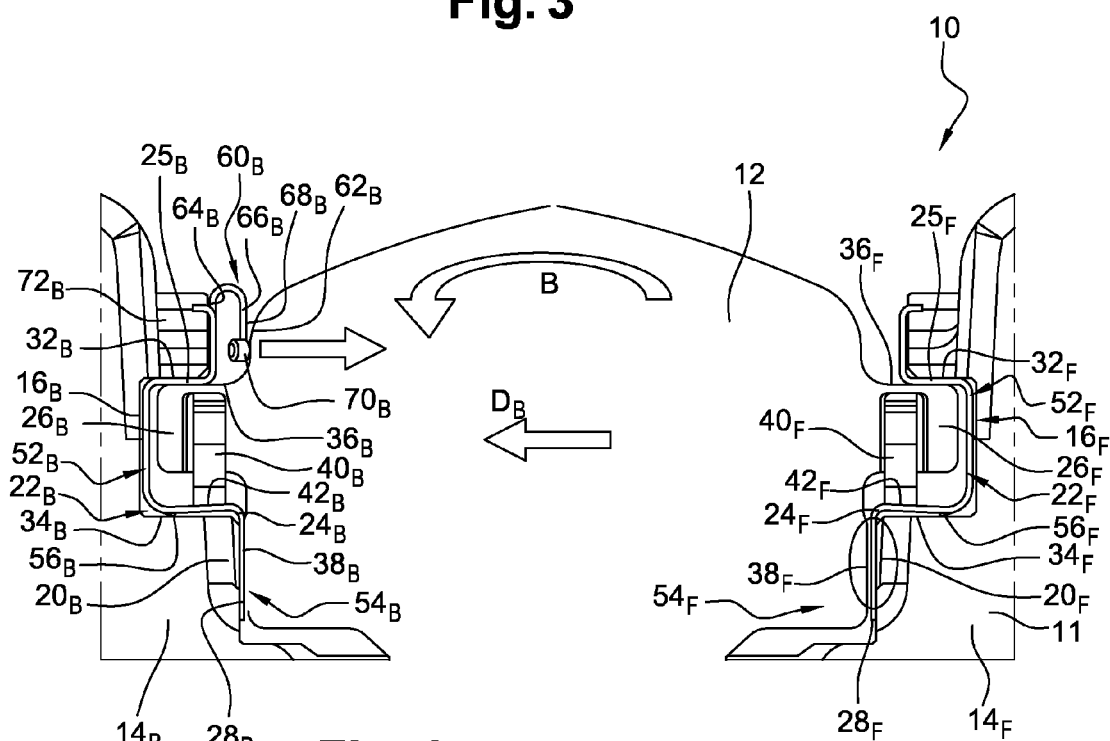
FIG. 4 is a view similar to that of FIG. 2 illustrating the mounting of brake pad in a carrier of a disc brake according to the invention depicted.

With this design, as depicted in FIGS. 3 and 4, each front $14_F$, and rear $14_B$ arm comprises a C-section axial housing $16_F$, $16_B$ which is open horizontally towards the opposite arm, rear $14_B$, or front $14_F$, and which is delimited by an upper face $32_F$, $32_B$ and by a lower face $34_F$, $34_B$ which are of horizontal overall orientation.

The arm also comprises an axial bearing surface $20_F$, $20_B$ of vertical overall orientation arranged under the housing $16_F$, $16_B$ of the corresponding arm $14_F$, $14_B$.

As depicted in FIGS. 3 and 4, each lug $26_F$, $26_B$ of each brake pad 12 is delimited by an upper facet $36_F$, $36_B$ of horizontal overall orientation.

Moreover, a lower facet $38_F$, $38_B$ of vertical orientation is situated under the associated lateral lug $26_F$, $26_B$.

The brake pad is fitted with two similar pad springs $40_F$, $40_B$ each of which is fixed to an associated lug $26_F$, $26_B$ of the brake pad 12.

Each pad spring $40_F$, $40_B$ comprises at least one lower branch $42_F$, $42_B$ for sliding which collaborates with the lower face $34_F$, $34_B$ of the associated housing and urges the upper facet $36_F$, $36_B$ of the lug $26_F$, $26_B$ to press vertically upwards against the upper face $32_F$, $32_B$ of the associated housing.

Figure 6:
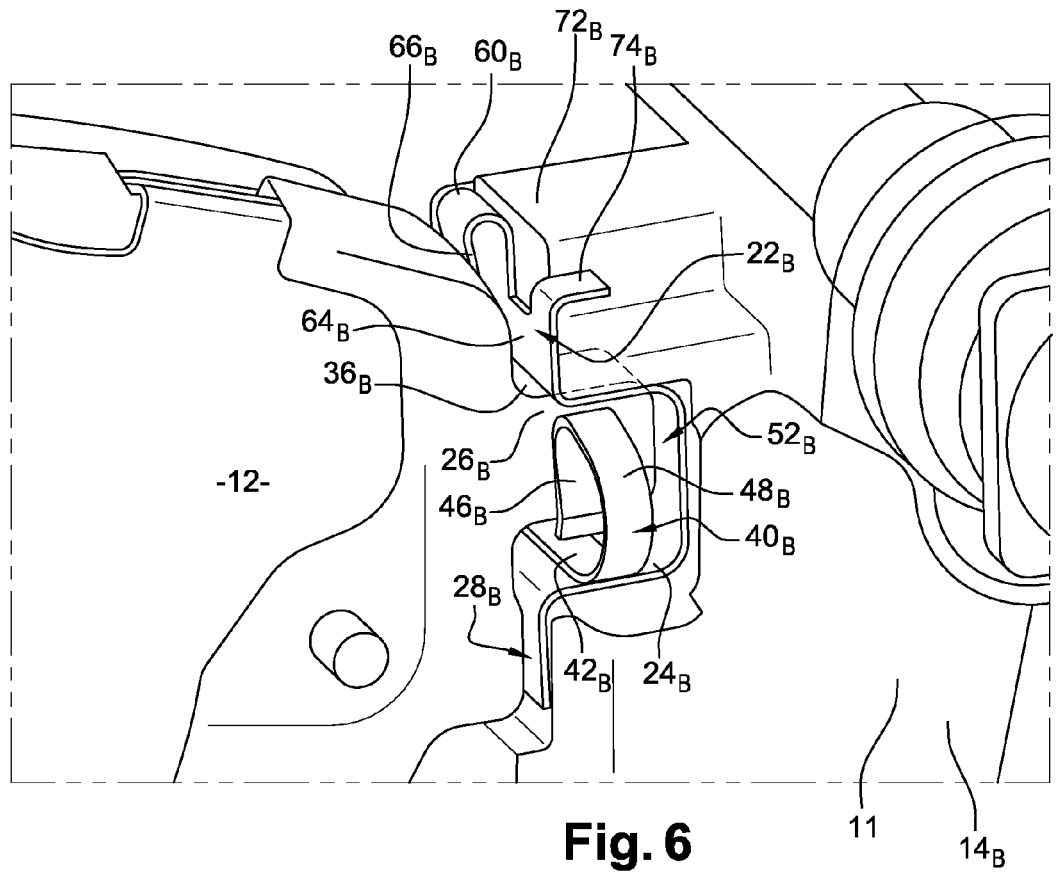
FIG. 6 is a detailed perspective view of the mounting of a brake pad in a back arm of a disc brake according to the invention.

As FIGS. 3, 4 and 6 illustrate, such a pad spring $40_F$, $40_B$ is commonly referred to as a "spiral spring" and comprises, in a manner that does not limit the invention, a clip $46_F$, $46_B$ which elastically clamps the lug $26_F$, $26_B$ of the brake pad in order to fix the pad spring $40_F$, $40_B$ to the corresponding lug $26_F$, $26_B$.

As illustrated in FIG. 6 which depicts the lug $26_B$ by way of example, such a pad spring $40_B$ further comprises a curved branch $48_B$ which connects the clip $46_B$ to the sliding lower branch $42_B$. This curved branch $48_B$ chiefly gives the pad spring its elasticity.

Moreover, the lugs $26_F$, $26_B$ are accepted in the housings 16 with the interposition of a lamellar element $22_F$, $22_B$ made of spring steel associated with each arm $14_F$, $14_B$ of the carrier 11.

Figure 5:
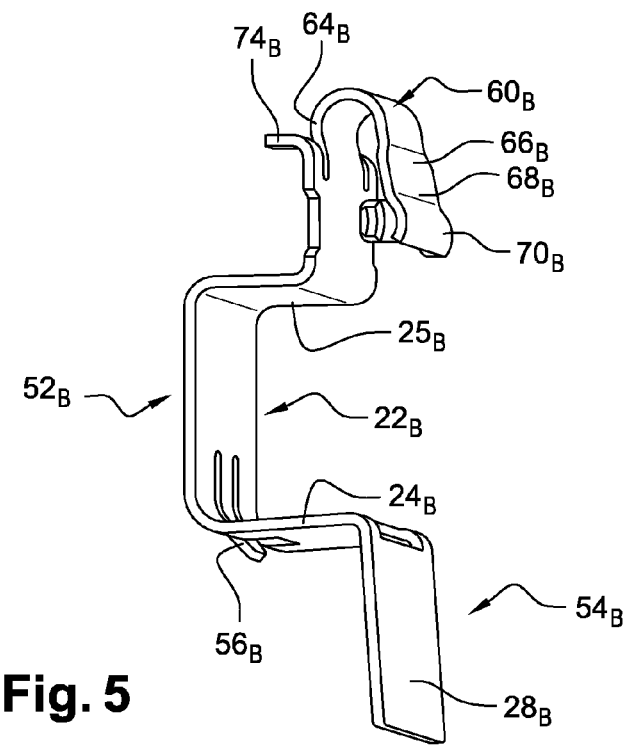
FIG. 5 is a perspective view of a back lamellar element comprising a preload spring according to the invention.

As illustrated more specially in FIGS. 3 to 5, each lamellar element $22_F$, $22_B$ comprises an upper part $52_F$, $52_B$ of axial orientation, referred to as sliding part, of C-shaped cross section open horizontally.

Each upper part is accepted and locked in the associated housing $16_F$, $16_B$ and comprises a lower first flange $24_F$, $24_B$ for sliding of substantially horizontal overall orientation which is interposed between the sliding branch $42_F$, $42_B$ of the pad spring $40_F$, $40_B$ and the lower face $34_F$, $34_B$ of the housing $16_F$, $16_B$, of the carrier 11.

Each upper part $52_F$, $52_B$ comprises an upper second vertical bearing flange $25_F$, $25_B$ of horizontal overall orientation which is interposed between the upper facet $36_F$, $36_B$ of the associated lug $26_F$, $26_B$ of the brake pad 12 and the upper face $32_F$, $32_B$ of the associated housing $16_F$, $16_B$.

Each lamellar element $22_F$, $22_B$ further comprises at least one lower bearing part $54_F$, $54_B$ of axial orientation comprising a third, transverse bearing, flange $28_F$, $28_B$ which extends the sliding flange $24_F$, $24_B$ and extends in a plane orthogonal to the plane of the sliding flange $24_F$, $24_B$ and is positioned in contact with the transverse bearing surface $20_F$, $20_B$ of the corresponding arm $14_F$, $14_B$ and is able to constitute a transverse end stop for the associated lower facet $38_F$, $38_B$ of the brake pad 12.

In particular, the transverse bearing surface $20_F$ of the front arm is able to form a transverse end stop for the end stop facet $38_F$ of the front lug $26_F$ of the brake pad 12 when the brake pad is pressed against the brake disc when a vehicle moving in a forward gear is under braking and the pad therefore moves transversally in the direction of the front arm.

Each lower first sliding flange $24_F$, $24_B$ moreover comprises an anchoring tongue $56_F$, $56_B$ which in this instance is cut into the lower first flange $24_F$, $24_B$, which projects downwards and collaborates with the lower face $34_F$, $34_B$ of the housing 16 to anchor itself in this lower face $34_F$, $34_B$ of the housing 16 as depicted in FIGS. 3 and 4.

In this type of brake, as the spring $40_F$, $40_B$ applies a vertical load, it is unable to reduce the transverse clearance between the lugs $26_F$, $26_B$ and the housings $16_F$, $16_B$ or to damp the transverse movements of the brake pad 12.

A spring $60_B$, referred to as the pad tangential preload spring, is interposed between an arm, in this instance the back arm $14_B$, and the brake pad 12 in order constantly to urge the brake pad 12 in a tangential direction that is horizontal overall, from the back forward, i.e. in the direction of the arrow $D_F$ of FIG. 3, so that in the absence of a braking load applied to the brake pad 12 a determined reduced clearance "$J_F$" is defined between the associated end stop facet $38_F$ of the brake pad 12 and the transverse bearing flange $28_F$ of the front lamellar element.

In the embodiment of the invention which is illustrated in the figures, the tangential preload spring $60_B$ of the brake pad 12 is a spring mounted compressed between the back arm $14_B$ and an associated part $62_B$ opposite belonging to the rear lateral part of the brake pad 12.

Advantageously, the brake pad 12 comprises an upper facet, referred to as a preload facet, of vertical orientation, situated above the rear lateral lug, which forms the part $62_B$ of the brake pad opposite the spring $60_B$.

To ensure optimum reliability of the spring $60_B$ and notably avoid any risk of accidental extraction of the spring, the brake pad tangential preload spring $60_B$ consists here of an elastically deformable leaf formed in a single piece with the back lamellar element $22_B$, as depicted in FIGS. 3 to 5.

The elastically deformable leaf $60_B$ is of vertical overall orientation, extends the vertical bearing flange $25_B$ of the back lamellar element upwards and collaborates with the preload facet $62_B$ of the brake pad 12.

As illustrated in FIG. 5, the best fatigue resistance of the elastically deformable leaf $60_B$ is obtained by shaping the leaf $60_B$ into the shape of a hairpin.

The leaf $60_B$ thus comprises a back branch $64_B$ which extends the vertical bearing flange $25_B$ of the back lamellar element $22_B$ upwards and a front branch $66_B$ which collaborates with the preload facet $62_B$ of the brake pad 12.

As illustrated more specifically in FIG. 5, the front branch $66_B$ has a lower free end section $68_B$ of domed profile a convex face $70_B$ of which collaborates with the preload facet $62_B$ of the brake pad 12, notably in such a way as to reduce contact pressure and thus reduce the friction loads likely to adversely affect the good axial sliding of the brake pad, and also so as to locate with precision the contact between the branch $66_B$ and the pad 12.

It will advantageously be noted that the back branch 64B collaborates with a complementary part $72_B$ opposite belonging to the back arm $14_B$ so as to immobilize the back lamellar element $22_B$ axially with respect to the back arm $14_B$.

In particular, the complementary part $72_B$ of the back arm $14_B$ is configured as a stud and the back branch $64_B$ of the preload spring $60_B$ comprises two tabs $74_B$ which extend substantially horizontally backwards from the back branch $64_B$ and grip the stud-like part $72_B$ to constitute an axial end stop with which the two opposing tabs $74_B$ collaborate.

The preload spring $60_B$ makes it possible to reduce the clearance $J_F$ between the associated end stop facet $38_F$ of the brake pad 12 and the transverse bearing flange $28_F$ of the front lamellar element when the brake pad 12 is urged to move $D_F$ under braking when in a forwards gear, as depicted in FIG. 3.

As illustrated in FIG. 5, the preload spring $60_B$ also makes it possible to damp the return of the brake pad 12 against the arm $14_B$ in the direction $D_B$, whether this return is the result of a simple release of the braking load or alternatively, in the most extreme case, of a release of braking load accompanied by a shift from reverse gear into forwards gear.

The invention makes it possible to reduce considerably the noise generated by the movements of a brake pad 12 in a carrier 11 while at the same time maintaining the operational stability of the pad 12.

The stiffness of the preload spring $60_B$ is advantageously chosen so that it is enough to set the rate of travel of the pad 12 upon a change in direction between forward gear and reverse gear.

The stiffness of the preload spring $60_B$ is also chosen to be sufficiently weak so that, even for light braking, contact can be made between the lower facet $38_B$ of the brake pad 12 and the transverse bearing surface $20_B$ of the arm $14_B$ through the third transverse bearing flange $28_B$ of the lamellar element $22_B$.

The invention claimed is:

1. A motor vehicle disc brake comprising:
   a carrier comprising at least two opposite arms, the opposite arms including a back arm and a front arm respectively, of vertical overall orientation, each of the arms comprising:
      a C-section axial housing open horizontally towards the opposite arm and delimited by an upper face and by a lower face of horizontal overall orientation, and
      an axial bearing surface of vertical overall orientation disposed under the housing;
   at least one brake pad comprising:
      two opposite lateral mounting lugs, the lateral mounting lugs including a back mounting lug and a front mounting lug respectively, each mounting lug being housed with transverse clearance in an associated housing of the associated respective back arms of the carrier and being delimited by an upper facet of horizontal overall orientation, and
      an abutment facet of vertical orientation associated with each lug;
   for each lug of the brake pad, a pad guiding spring, a back guiding spring and a front guiding spring respectively fixed to the associated back lug and front lug, respectively, of the brake pad, each pad guiding spring including at least one sliding lower branch which collaborates with the lower face of the associated housing and which urges the upper facet of the lug to press vertically upwards against the upper face of the associated housing;
   a brake disc which rotates as one with an associated wheel of a vehicle and which extends in a plane transverse to the carrier and comprises two opposite annular braking tracks, the brake pad being pressed against one of the annular braking tracks under braking;
   a lamellar element for each arm of the carrier, including a back lamellar element and a front lamellar element respectively, made of spring steel, which comprises at least:
      a C-section axial upper sliding part housed and blocked in the associated housing, which comprises
         a lower first sliding flange of substantially horizontal overall orientation which is interposed between the sliding branch of the pad spring and the lower face of the housing of the carrier, and
         an upper second vertical bearing flange of horizontal overall orientation, which is interposed between the upper facet of the associated lug of the brake pad and the upper face of the associated housing, and
      at least one axial lower bearing part comprising a third transverse bearing flange, which extends the sliding flange of vertical overall orientation and is disposed in contact with the transverse bearing surface of the associated arm and is configured to act as a transverse end stop for the associated lower facet of the brake pad, the transverse bearing surface of the front arm being configured to form a transverse end stop for the end stop facet of the front lug of the brake pad when the brake pad is being pressed against the brake disc when the vehicle being driven in a forwards gear is being braked; and
      at least one tangential preload spring configured to tangentially preload the pad, which is interposed between one of the arms and the pad, which constantly urges the pad in a direction that is horizontal overall, from the back forward, to define a small determined clearance between the associated end stop facet of the brake pad and the transverse bearing flange of the front lamellar element, in the absence of any braking force applied to the brake pad, the pad tangential preload spring being mounted compressed between the back arm and an associated part opposite to the back arm, the associated part being part of the brake pad.

2. The disc brake according to claim 1, wherein the said brake pad preload spring is an elastically deformable leaf formed as a single piece with the back lamellar element.

3. The disc brake according to claim 2, wherein the brake pad comprises an upper preload facet of vertical orientation and situated above the back lateral lug, the elastically deformable leaf being of vertical overall orientation, extending the vertical bearing flange of the back lamellar element upwards and collaborates with the preload facet of the brake pad.

4. The disc brake according to claim 3, wherein the elastically deformable leaf is a leaf in the shape of a hairpin which comprises a back branch which extends the vertical bearing flange of the back lamellar element upwards and a front branch which collaborates with the preload facet of the brake pad.

5. The disc brake according to claim 4, wherein the front branch comprises a free lower end section of domed profile of which a convex face collaborates with the preload facet of the brake pad.

6. The disc brake according to claim 4, wherein the back branch collaborates with a complementary part opposite belonging to the back arm to immobilize the back lamellar element axially with respect to the back arm.

* * * * *